(12) United States Patent
Daniel et al.

(10) Patent No.: US 12,010,267 B2
(45) Date of Patent: *Jun. 11, 2024

(54) SYSTEMS AND METHODS FOR PROVIDING MULTI-MODAL INTERACTION VIA USER EQUIPMENT

(71) Applicant: Verizon Patent and Licensing Inc., Basking Ridge, NJ (US)

(72) Inventors: Goldstein D. Daniel, Chennai (IN); Priyanka Muthukrishnan, Chennai (IN); Jaidev Haridoss, Chennai (IN); Marina Sruthi M, Chennai (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/150,972

(22) Filed: Jan. 6, 2023

(65) Prior Publication Data

US 2023/0156121 A1 May 18, 2023

Related U.S. Application Data

(63) Continuation of application No. 17/464,345, filed on Sep. 1, 2021, now Pat. No. 11,575,785, which is a continuation of application No. 16/901,090, filed on Jun. 15, 2020, now Pat. No. 11,134,149.

(51) Int. Cl.
*H04M 3/493* (2006.01)
*H04M 3/51* (2006.01)

(52) U.S. Cl.
CPC ......... *H04M 3/493* (2013.01); *H04M 3/5166* (2013.01); *H04M 3/5183* (2013.01); *H04M 2203/254* (2013.01)

(58) Field of Classification Search
None
See application file for complete search history.

(56) References Cited

U.S. PATENT DOCUMENTS

| | | |
|---|---|---|
| 6,418,199 B1 | 7/2002 | Perrone |
| 7,080,315 B1 | 7/2006 | Lucas et al. |
| 7,142,661 B2 | 11/2006 | Erhart et al. |
| 7,813,485 B2 | 10/2010 | Yin et al. |
| 11,134,149 B1 | 9/2021 | Daniel et al. |
| 11,575,785 B2 * | 2/2023 | Daniel .................. H04M 3/527 |
| 2003/0046346 A1 | 3/2003 | Mumick et al. |
| 2003/0162561 A1 | 8/2003 | Johnson et al. |
| 2005/0172232 A1 | 8/2005 | Wiseman |

(Continued)

*Primary Examiner* — Hemant S Patel

(57) ABSTRACT

A system described herein may provide a technique for a multi-modal interaction experience with a User Equipment ("UE") via multiple concurrent presentation modes. Such multiple modes may include a voice call with an interactive voice response ("IVR") system, as well as the simultaneous presentation of information and/or selectable options at a UE associated engaged in the voice call with the IVR system. The information may be presented via a graphical user interface at the UE that is engaged in the call with the IVR system. In this manner, the UE may provide a multi-modal experience to a user, in which the user can simultaneously interact with the IVR system via the call, and can also receive or provide further interactions related to call via the GUI.

20 Claims, 12 Drawing Sheets

(56) References Cited

U.S. PATENT DOCUMENTS

| | | | |
|---|---|---|---|
| 2011/0286586 A1* | 11/2011 | Saylor | H04M 1/72436 |
| | | | 379/88.13 |
| 2012/0140904 A1* | 6/2012 | Li | H04W 4/16 |
| | | | 379/88.01 |
| 2013/0272510 A1 | 10/2013 | Mittal | |
| 2015/0023484 A1 | 1/2015 | Ni et al. | |
| 2016/0192108 A1* | 6/2016 | Chaudhary | H04W 12/06 |
| | | | 455/411 |
| 2018/0241879 A1* | 8/2018 | Badger | H04M 3/493 |

\* cited by examiner

SYSTEMS AND METHODS FOR PROVIDING MULTI-MODAL INTERACTION VIA USER EQUIPMENT

CROSS-REFERENCE TO RELATED APPLICATION

This Application is a Continuation of U.S. patent application Ser. No. 17/464,345, filed on Sep. 1, 2021, titled "SYSTEMS AND METHODS FOR PROVIDING MULTI-MODAL INTERACTION VIA USER EQUIPMENT," which is a Continuation of U.S. patent application Ser. No. 16/901,090, filed on Jun. 15, 2020 (now U.S. Pat. No. 11,134,149), titled "SYSTEMS AND METHODS FOR PROVIDING MULTI-MODAL INTERACTION VIA USER EQUIPMENT," the contents of which are herein incorporated by reference in their entirety.

BACKGROUND

Entities such as service providers, customer support centers, or the like may provide interactive voice response ("IVR") systems or other telephone-based systems for users to call and receive automated assistance. Such systems often consume relatively large amounts of time and/or require relatively large amounts of input from a user, such as series of keypresses on a telephone.

DETAILED DESCRIPTION OF THE PREFERRED EMBODIMENTS

The following detailed description refers to the accompanying drawings. The same reference numbers in different drawings may identify the same or similar elements.

Embodiments described herein provide for an interaction with a UE via multiple concurrent presentation modes. As described herein, for example, such interactions may be referred to a "multi-modal experience." Such multiple modes may include, for example, a voice call with an IVR system, as well as the simultaneous presentation of information and/or selectable options at a UE associated with a user who is engaged in the voice call with the IVR system. The information may be presented via a graphical user interface ("GUI"), by an application executing at the same UE that is engaged in the call with the IVR system. In this manner, the UE of some embodiments may provide a multi-modal experience to a user, in which the user can simultaneously interact with the IVR system via the call, and can also receive or provide further interactions related to call via the GUI. Thus, a more robust way of engaging users may be provided than techniques that rely solely on IVR systems.

Figure 1:
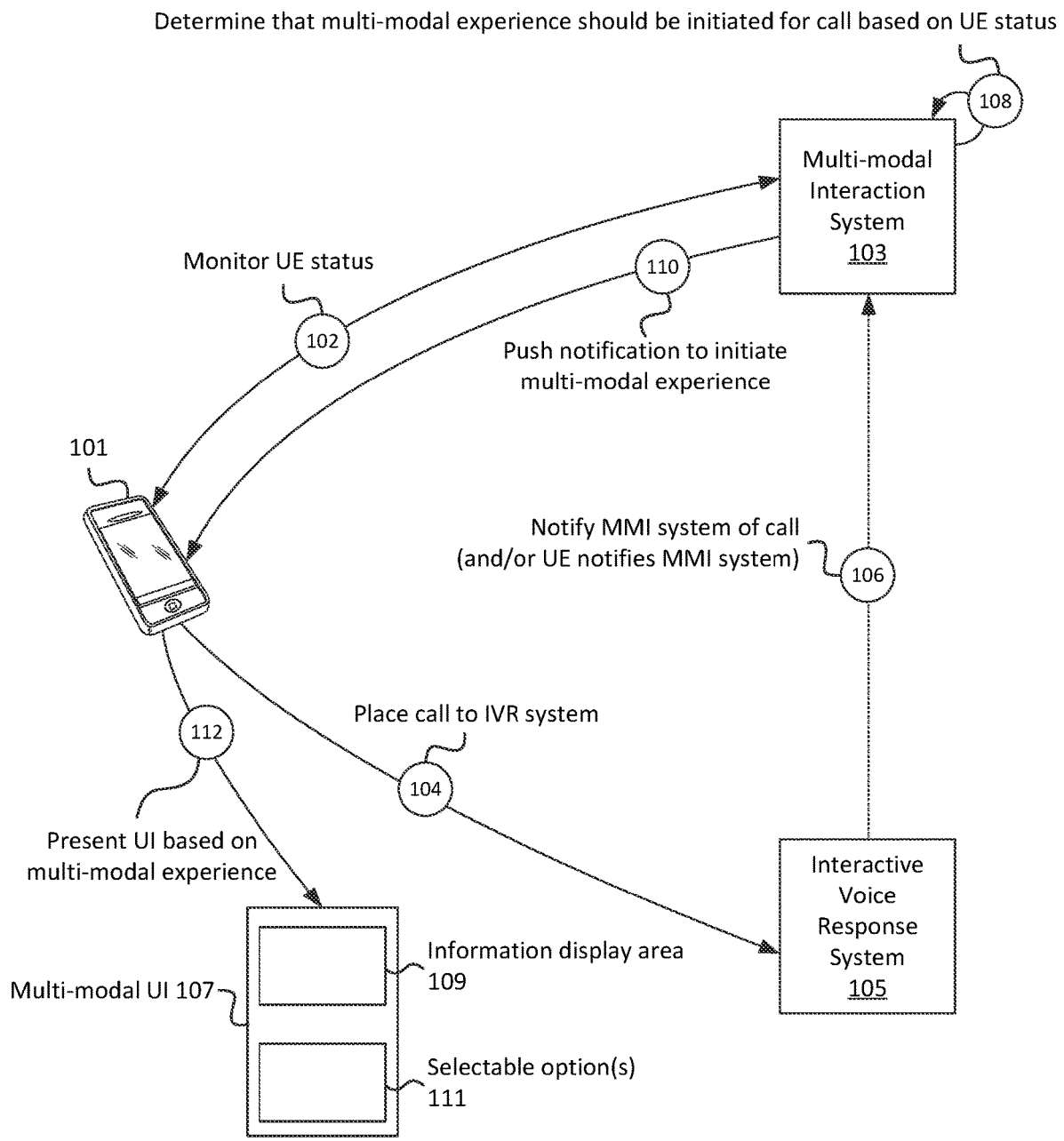
FIG. 1 illustrates an example overview of one or more embodiments described herein, in which a Multi-Modal Interaction ("MMI") system of some embodiments may initiate the presentation of a user interface ("UI") at a User Equipment ("UE") to facilitate a multi-modal experience between the UE an IVR system.

As shown in FIG. 1, for example, UE 101 may communicate (at 102) with MMI system 103 on an ongoing basis. For example, UE 101 may implement an application programming interface ("API") via which UE 101 communicates with MMI system 103, which may be an application server and/or some other network-accessible resource. In some embodiments, the API may be provided via an operating system or firmware associated with UE 101. In some embodiments, the API may be provided via an application installed at UE 101 (e.g., as pre-loaded on UE 101 by a manufacturer or vendor, and/or as obtained from an application storefront or other source). MMI system 103 may thus monitor information associated with multiple UEs 101, and may monitor such information in accordance with identifying information for corresponding UEs 101 in order to track which monitored information is associated with which particular UE 101. The identifying information may include Mobile Directory Numbers ("MDNs"), International Mobile Subscriber Identity ("IMSI") values, International Mobile Station Equipment Identity ("IMEI") values, Internet Protocol ("IP") addresses, and/or other suitable identifiers based on which UEs 101 may be uniquely identified.

In some embodiments, the communications (at 102) may include UE status information, which may include information such as sensor information (e.g., information detected or monitored by one or more sensors of UE 101, such as motion sensors, accelerometers, or the like), network connectivity information (e.g., information associated with a Wi-Fi network to which UE 101 is connected, information indicating that UE 101 is not connected to a Wi-Fi network, information associated with a cellular network to which UE 101 is connected, etc.), peripheral connectivity information (e.g., information indicating types of peripherals to which UE 101 is connected via short-range communications techniques, such as Bluetooth speakers, automotive infotainment systems, etc.), location information (e.g., an indication of a geographical location at which UE 101 is located), call information (e.g., information regarding calls made or received by UE 101), and/or other suitable information.

In some embodiments, in addition to, or in lieu of monitoring (at 102) UE status information on an ongoing basis, MMI system 103 may request UE status information based on one or more trigger events. For example, in some embodiments, MMI system 103 may request UE status information after receiving (e.g., at 106, described below) an indication from IVR system 105 that UE 101 has called IVR system 105, and/or otherwise determining (e.g., at 108, also described below) that a multi-modal experience should be initiated for UE 101.

As further shown, UE 101 may, at some point, place a call to IVR system 105. For example, IVR system 105 may be reachable via voice calls, and may implement an API or other suitable interface via which IVR system 105 can answer voice calls and/or otherwise establish communication sessions (e.g., voice call sessions) with one or more UEs 101. IVR system 105 may provide an IVR menu, via which menu items are audibly presented to UE 101 via the established call, and via which selections may be received from UE 101 (e.g., in the form of Dual-Tone Multi-Frequency ("DTMF") signaling or some other suitable signaling, which may be based on button presses or other suitable operations at UE 101).

IVR system 105 may, in some embodiments, notify (at 106) MMI system 103 that a call was received from UE 101, and/or that an IVR menu is being presented to UE 101 via an established voice call. For example, IVR system 105 may provide an identifier associated with UE 101, such as an MDN, an IP address, and/or other suitable information. IVR system 105 may have received the identifier based on signaling associated with establishing the voice call, and/or may receive the identifier from UE 101 (e.g., via the established voice call).

In some embodiments, in addition to or in lieu of the notification (at 106) from IVR system 105, UE 101 may notify MMI system 103 of the call. For example, the API may have access to call information associated with UE 101 (e.g., telephone numbers or other identifiers of calls placed by UE 101), and may notify MMI system 103 that the call was placed to a particular number corresponding to IVR system 105. For example, in some embodiments, the API may maintain a list of telephone numbers of IVR systems or other entities that are associated with multi-modal experiences facilitated by MMI system 103, and may notify MMI system 103 when UE 101 contacts a particular one of such IVR systems or other entities. Additionally, or alternatively, MMI system 103 may determine that UE 101 called IVR system 105, based on UE status information (monitored at 102).

In some embodiments, IVR system 105 may have previously registered with MMI system 103 as being associated with a multi-modal experience, and/or IVR system 105 may otherwise determine that IVR system 105 is (or is potentially) associated with a multi-modal experience. For example, IVR system 105 may use machine learning and/or other techniques to determine that IVR system 105 is associated with a multi-modal experience. Such techniques may be based on one or more models generated or maintained by MMI system 103, which may be based on past interactions with IVR system 105 and/or other systems having attributes similar to those of IVR system 105. Such models may be generated and/or refined based on transcripts, logs, or the like, that reflect interactions between one or more different UEs 101 and one or more different IVR systems 105. MMI system 103 and/or some other device or system may analyze such interactions using Natural Language Processing ("NLP"), neural networks, pattern matching, clustering, and/or other suitable techniques to identify features and/or attributes associated with UEs 101, IVR systems 105, and/or interactions between UEs 101 and IVR systems 105 (e.g., IVR menu options that were provided by IVR systems 105 and/or selected by UEs 101, feedback information from UEs 101, or the like). Based on these features and/or attributes, MMI system 103 may generate and/or refine models for one or more particular IVR systems 105 and/or UEs 101, in order to determine the types of information to present via a multi-modal experience when a given UE 101 interacts with a given IVR system 105 (e.g., the particular UE 101 and IVR system 105 depicted in FIGS. 1-3).

In some embodiments, IVR system 105 may provide configuration information associated with one or more IVR menus, offered or implemented by IVR system 105, to MMI system 103. For example, during the registration process, IVR system 105 may provide such configuration information to MMI system 103. Such configuration information may include, for example, IVR menus, states associated with particular IVR menus or menu items, states reached via the selection of one or more particular IVR menu items, etc. In some embodiments, the configuration information may include attributes of UEs 101 and/or users based on which particular states, IVR menus, IVR menu items, etc. may be selected. In some embodiments, additionally, or alternatively, MMI system 103 may determine such configuration information utilizing machine learning and/or other suitable techniques, based on receiving training information that may be based on interactions between IVR system 105 and one or more UEs 101.

MMI system 103 may, in accordance with some embodiments, determine (at 108) that a multi-modal experience should be initiated for the call based on some conditional triggers or the like. For example, MMI system 103 may determine that the multi-modal experience should be initiated based on a registration of IVR system 105 with MMI system 103, and/or one or more models, as discussed above, based on which MMI system 103 may determine that interactions with IVR system 105 should be associated with a multi-modal experience. In some embodiments, MMI system 103 may determine (at 108) that the multi-modal experience should be initiated based on UE status information, which may generally be based on attributes that may be associated with, or indicative of, a user's ability to simultaneously access information presented via multiple presentation modes, such as viewing a display screen of UE 101 while also receiving audio via UE 101.

For example, MMI system 103 may determine (e.g., based on status information monitored at 102) whether UE 101 is connected to an external audio device (e.g., a Bluetooth® speaker, wireless earbuds, wired headphone, or the like). As another example, MMI system 103 may determine whether UE 101 is associated with a driver of a vehicle, which may be based on location or speed information associated with UE 101 (e.g., where if UE 101 is traveling at least a threshold speed, MMI system 103 may determine that UE 101 is associated with a moving vehicle and is thus potentially associated with a driver of the vehicle) and/or based on connection of UE 101 to a navigation or infotainment system associated with a vehicle.

Based on the above criteria and/or different criteria, MMI system 103 may determine (at 108) whether a multi-model experience should be initiated for UE 101. For example, if MMI system 103 determines that UE 101 is connected to an external audio device, then MMI system 103 may determine that the multi-modal experience should be initiated for UE 101. Generally, if UE 101 is connected to an external audio device, a user of UE 101 may have the ability to view a display screen of UE 101 while on the call, as the user would not need to place UE 101 against the user's ear to hear the call. On the other hand, if MMI system 103 determines that UE 101 is in a moving vehicle and/or the user of UE 101 is driving the vehicle, then MMI system 103 may determine that the multi-modal experience should not be enabled for the call.

Based on determining (at 108) that the multi-modal experience should be enabled for the call, MMI system 103 may output (at 110) a notification to UE 101 that the multi-modal experience has been initiated. For example, MMI system 103 may output a "push" notification to UE 101, which may be a notification sent via the API mentioned above, and/or an operating system-level push notification in some embodiments.

In some embodiments, the notification (at 110) may include information to present (e.g., visual information), such as text, images, links, GUI elements, or the like. In some embodiments, the notification may include references or pointers to resources or templates previously stored by UE 101 (e.g., which may have been previously installed or configured at UE 101 via the API) and/or resources or templates stored by another device or system (e.g., a link with a Uniform Resource Locator ("URL") pointing to a particular web-accessible resource). As discussed in more detail below, the information indicated by the notification may be based on a state of the call and/or other information provided by IVR system 105 and/or UE 101.

Based on the information provided to UE 101 (e.g., via notification 110), UE 101 may present (at 112) multi-modal UI 107, which may be a GUI or other suitable type of interface associated with the multi-modal experience for the call. Multi-modal UI 107 may include some or all of the information provided or referenced by MMI system 103, such as information displayed via one or more information display areas 109, one or more selectable options (e.g., buttons, menus, or the like) 111, and/or other suitable interface elements. UE 101 may present multi-modal UI 107 while simultaneously playing audio associated with the call (e.g., via a speakerphone or external audio device). As noted above, in some embodiments, the information presented via information display area 109 and/or selectable options 111 may be based on a state of the call and/or a state of an IVR menu associated with the call, and may include options that correspond to IVR menu options presented by IVR system 105 (e.g., options presented via the voice call).

Figure 2:
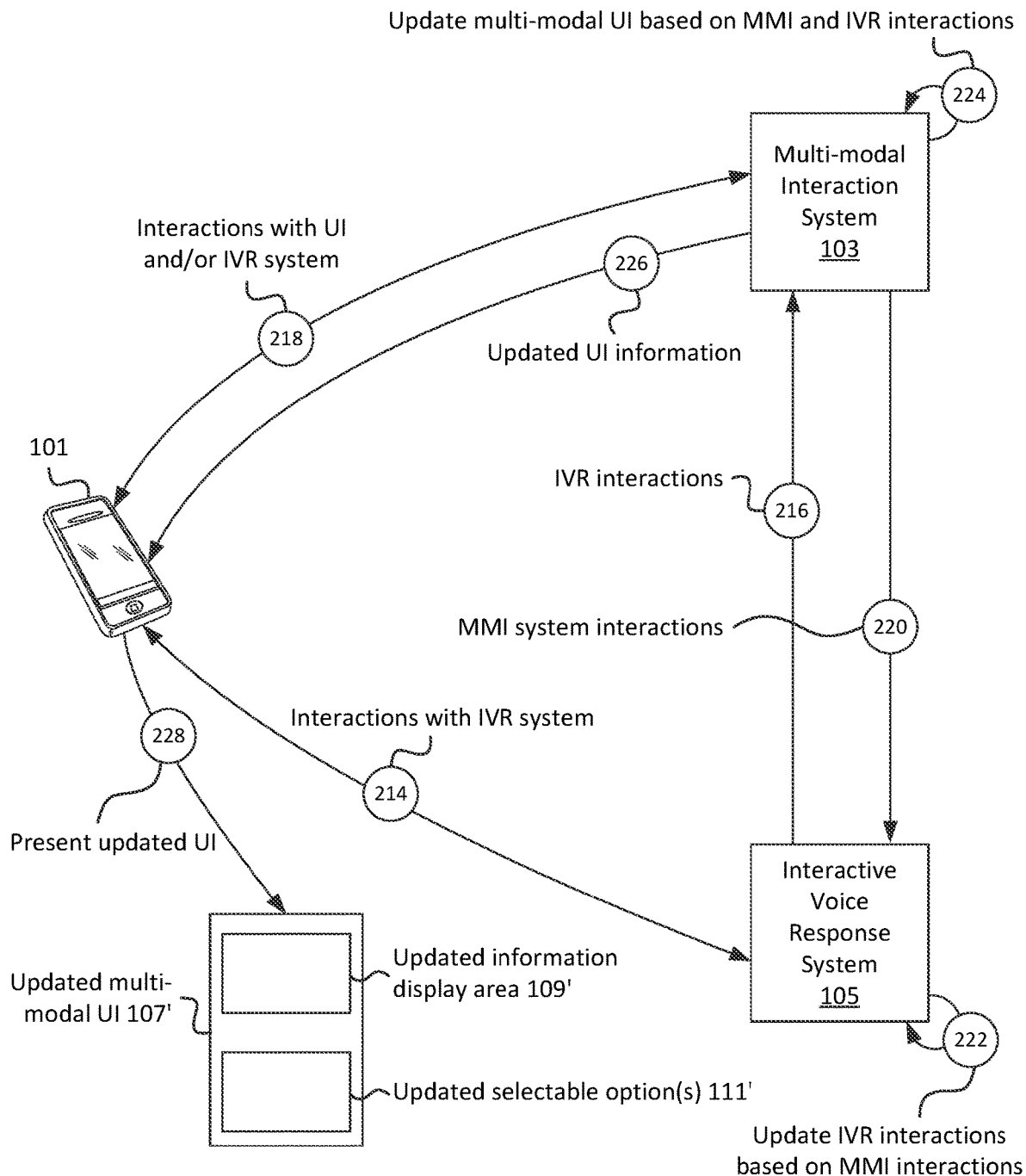
FIG. 2 illustrates an example scenario in which a MMI system of some embodiments may update a UI at the UE to further facilitate the multi-modal experience between the UE and the IVR system.

As shown in FIG. 2, the information presented via multi-modal UI 107 may be updated in an ongoing basis, based on interactions made via the IVR menu, (e.g., keypresses made that correspond to DTMF tones or other suitable signaling via a voice call) and/or interactions made via multi-modal UI 107 (e.g., selections of one or more options 111). For example, during the call, UE 101 may interact (at 214) with IVR system 105 and/or may interact (at 218) with multi-modal UI 107. For example, a user of UE 101 may provide (at 214) voice input, keypresses, and/or other suitable interactions to IVR system 105 during the call, where such interactions may correspond to selections of IVR menu items and/or other suitable interactions. Similarly, UE 101 may receive (at 218) selections of button presses, menu items, etc. associated with selectable options 111 presented via multi-modal UI 107.

In some embodiments, when receiving or providing (at 214) interactions with UE 101, IVR system 105 may notify (at 216) MMI system 103 of such interactions. For example, IVR system 105 may notify MMI system 103 of IVR menu selections or other input received from UE 101, and/or IVR system 105 may indicate particular IVR menu items or other information provided to UE 101 via the voice call. In some embodiments, IVR system 105 may provide other information, such as state information indicating a state of one or more IVR menus associated with the interactions with UE 101. In this manner, MMI system 103 may be kept up to date regarding the state of the one or more IVR menus associated with the call between IVR system 105 and UE 101.

Similarly, when receiving or providing (at 218) interactions with UE 101, MMI system 103 may notify (at 220) IVR system 105 of such interactions. For example, MMI system 103 may notify IVR system 105 of selections or other input received from UE 101 (e.g., via multi-modal UI 107), and/or MMI system 103 may indicate particular information and/or selectable options provided to UE 101 via multi-modal UI 107. In this manner, IVR system 105 may be kept up to date regarding interactions made via MMI system 103, which may cause IVR system 105 to update (at 222) state of the one or more IVR menus associated with the call between IVR system 105 and UE 101 based on such interactions with MMI system 103.

In some embodiments, IVR system 105 and/or MMI system 103 may implement one or more APIs or other suitable protocols, via which IVR system 105 and MMI system 103 may communicate (e.g., at 216 and/or 220). For example, as discussed above, IVR system 105 may register with MMI system 103, in which the registration process may include establishing a communication pathway via which IVR system 105 and MMI system 103 may update each other (e.g., at 216 and/or 220) regarding interactions received via IVR system 105 and/or MMI system 103, respectively. Additionally, or alternatively, MMI system 103 and/or IVR system 105 may offer an "open" API (or other communication pathway) via which MMI system 103 and/or IVR system 105 may each receive (e.g., at 216 and/or 220) interaction information from each other.

In some embodiments, for example, IVR system 105 may provide, to MMI system 103, a representation of a full IVR menu that is presented to, or is available for presentation to, UE 101. The IVR menu may be represented in terms of menu states and actions and/or conditions that lead to a given state. For example, a particular menu state may be reached after a particular IVR menu selection (e.g., a button press of "2" at UE 101), after a different menu state has been reached. In this example, IVR system 105 may have provided the full menu information to MMI system 103 during a registration process, upon receiving (e.g., at 104) the call from UE 101, upon receiving (at 214) interactions from UE 101, and/or at some other time. Similarly, in this example, IVR system 105 may notify (at 216), via an API or other suitable communication pathway, MMI system 103 that interactions (received at 214) from UE 101 include a button press of "2," and may also indicate a current menu state at the time the button press was received. Additionally, or alternatively, IVR system 105 may notify (at 216) MMI system 103 of a new menu state that is reached after receiving (at 214) the button press from UE 101.

Based on the received (at 216 and/or 218) interaction information, MMI system 103 may update (at 224) multi-modal UI 107, and provide (at 226) updated multi-modal UI 107' to UE 101. For example, multi-modal UI 107' may include information display area 109' and/or updated selectable options 111', which may correspond to an updated IVR menu state that is based on one or more interactions received (at 216 and/or 218) from UE 101. In some embodiments, MMI system 103 may determine or identify a particular state and/or set of IVR menu items or menu items further based on IVR configuration information, which, as discussed above, may have been provided by IVR system 105 during a registration process and/or determined by MMI system 103 via machine learning and/or other suitable techniques. In this manner, multi-modal UI 107' may continue to be congruous with the state of the IVR menu items presented via the voice call, and may enhance the user experience as compared to interacting solely with the IVR menu via the voice call.

UE 101 may present (at 228) multi-modal UI 107, which may include updated information in one or more updated display areas 109' and/or updated selectable options 111', based on the updated state of the IVR menu(s) associated with IVR system 105. MMI system 103 and/or IVR system 105 may continue to interact (at 214 and/or 218) with UE 101, and may continue to update (at 222 and/or 224) information presented to UE 101 via multiple respective modes of communication (e.g., via voice call associated with IVR system 105, and/or via multi-modal UI 107 associated with MMI system 103) based on such interactions. In this manner, both modes of communication may complement each other and provide a robust user experience.

Figure 3:
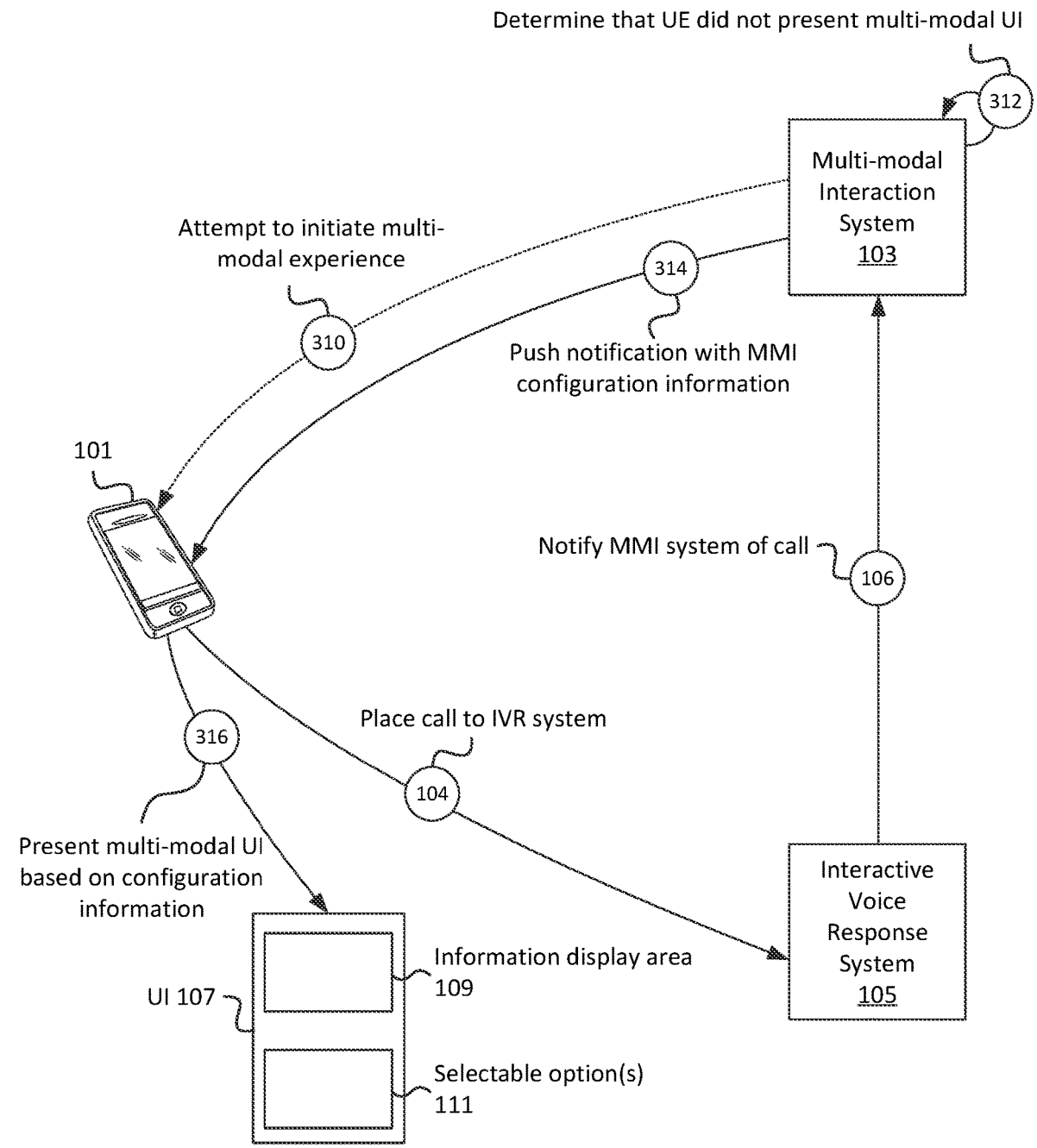
FIG. 3 illustrates an example initiation of a multi-modal experience in which a UE is not previously configured to provide the multi-modal experience of some embodiments.
Figure 4:
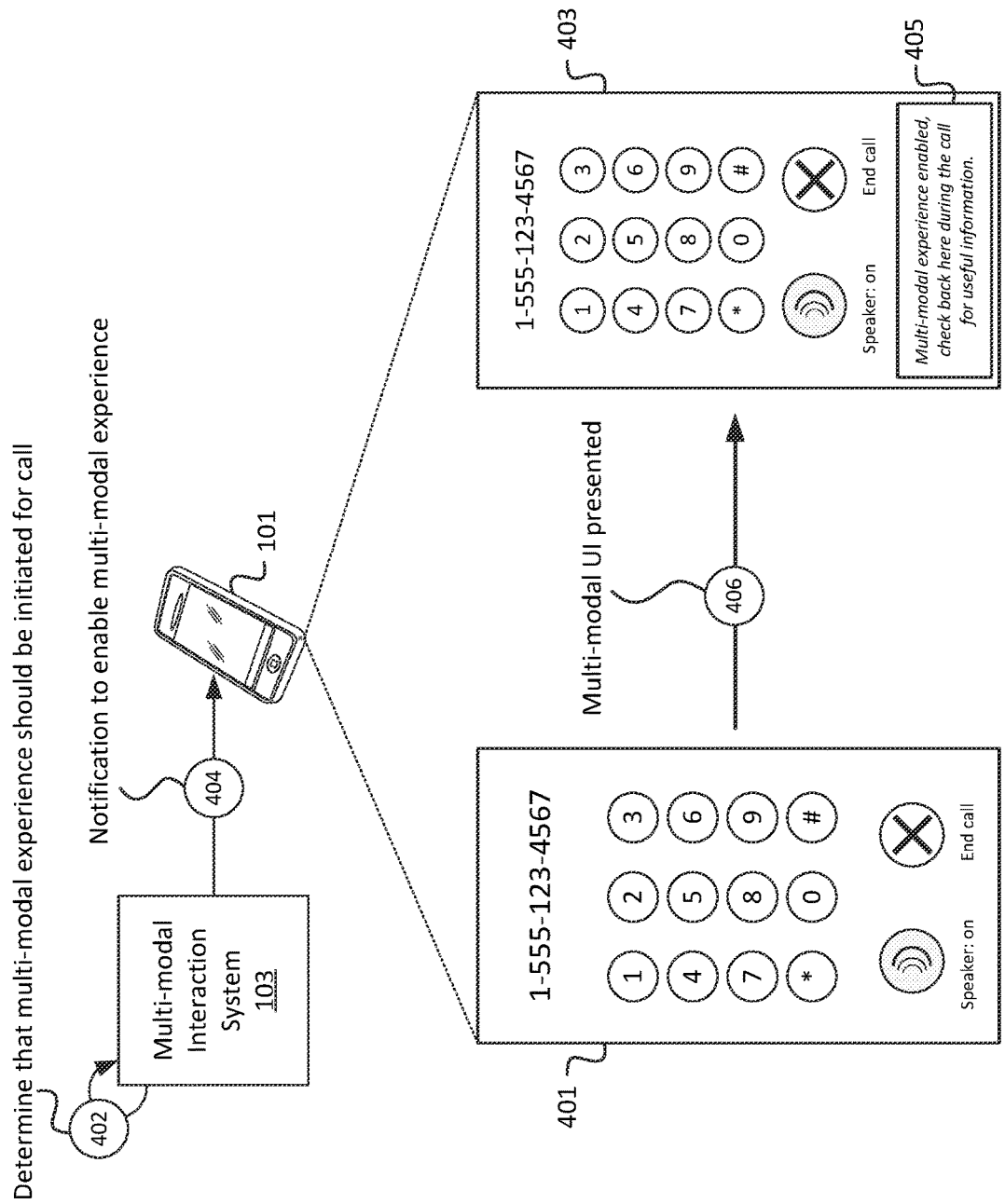
FIGS. 4-8 illustrate example UIs that may be presented in accordance with a given multi-modal experience of some embodiments.

In some embodiments, UE 101 may not implement an API or execute an application that is configured to communicate with MMI system 103. In some such scenarios, UE 101 may have previously installed such API or application and subsequently uninstalled the API or application. In this manner, MMI system 103 may not be "aware" that UE 101 is not configured to communicate with MMI system 103 via such API or application. As discussed below, MMI system 103 may notify UE 101 of the availability of such API or application in order to provide a multi-modal experience in accordance with embodiments described herein. For example, as shown in FIG. 3, UE 101 may place (at 104) a call to IVR system 105, and IVR system 105 may notify (at 106) MMI system 103 of the call. As similarly discussed above, IVR system 105 may have previously registered with MMI system 103, and/or MMI system 103 may otherwise determine that a multi-modal experience for the call should be initiated.

Accordingly, MMI system 103 may attempt (at 310) to initiate the multi-modal experience. For example, as described above (e.g., with respect to arrow 110 in FIG. 1), MMI system 103 may output a notification or other type of message, directed at UE 101 (e.g., directed to the API or application that is expected to be installed at UE 101). In this example, UE 101 may not receive the message, may reply to MMI system 103 that the API or application is not installed at UE 101, and/or may otherwise indicate to MMI system 103 indicating that the multi-modal experience is not available at UE 101. In some embodiments, MMI system 103 may determine (at 312) that UE 101 did not present a multi-modal UI based on the attempt (made at 310). For example, MMI system 103 may determine that UE 101 did not provide a confirmation within a threshold amount of time (e.g., within 2 seconds, within 30 seconds, or some other configurable threshold), that UE 101 provided an unrecognized or unexpected response to the attempt, that UE 101 did not provide UE status information within a threshold amount of time, and/or that UE 101 otherwise indicated that UE 101 is unable to initiate the multi-modal experience.

Based on this determination (at 312), MMI system 103 may output (at 314) configuration information to UE 101 to initiate the multi-modal experience. For example, MMI system 103 may provide UE 101 with a link to an application storefront or other resource from which UE 101 may obtain an API or application, via which UE 101 may communicate with MMI system 103 (e.g., to provide the multi-modal experience). This information may be provided (at 314) to UE 101 as a push notification, a Short Message Service ("SMS") message, a Multimedia Messaging Service ("MMS"), and/or in some other suitable fashion. In some embodiments, the configuration information may include information that may be stored by UE 101 and, once the API and/or application are installed, may be used by such API and/or application to present (at 316) multi-modal UI 107.

FIGS. 4-8 illustrate example UIs that may be presented in accordance with respective multi-modal experiences of some embodiments. For example, in the example of FIG. 4, UE 101 may present UI 401 when initiating a voice call. UI 401 may include call-related options, such as an alphanumeric keypad, an "End call" button, and a "Speaker" button. In this example, the "Speaker" button may have been selected, as denoted by the shading on the button and the "Speaker: on" text. Thus, call audio associated with the call may be played via a speaker of UE 101. Additionally, or alternatively, UE 101 may be connected to an external audio device, which may receive and audibly present call audio associated with the call.

Further, in this example, assume that the call has been placed to a particular IVR system 105, which has registered with MMI system 103 and/or which MMI system 103 otherwise has determined is associated with a multi-modal experience. MMI system 103 may thus be notified (e.g., by UE 101 and/or by IVR system 105, as discussed above) and/or may otherwise determine (at 402) that UE 101 is engaged in a voice call with IVR system 105, and/or is interacting with a particular IVR menu provided by IVR system 105. Based on this determination, MMI system 103 may notify (at 404) UE 101 to enable a multi-modal experience for the call. For example, as discussed above, UE 101 may implement an API or application that is configured to communicate with MMI system 103 to present a multi-modal experience.

Based on receiving the notification (at 404), UE 101 may present (at 406) multi-modal UI 403. In this example, multi-modal UI 403 may include a modified version of call UI 401. For example, some elements of call UI 401 may be modified, such as reducing the size of graphical elements (e.g., alphanumeric buttons, "End call" button, "Speaker" button, etc.), reducing the size of text in call UI 401, and/or other suitable modifications. As further shown, multi-modal UI 403 may include display area 405, which may present information indicating that a multi-modal experience has been enabled for the call, and that multi-modal information and/or selectable options may be presented during the call. In some embodiments, an audible notification (e.g., a beep, a ding, or some other sound), a haptic notification (e.g., vibration), and/or some other type of notification may be presented in conjunction with information display area 405, indicating that the multi-modal experience has been initiated.

In some embodiments, although not explicitly shown here, an option to confirm the multi-modal experience and/or an option to disable the multi-modal experience may be presented in conjunction with display area 405. In this example, the information presented via display area 405 may be based on the placing of the call to IVR system 105, the presentation of a particular IVR menu by IVR system 105, or the like. As discussed below, different information and/or options may be presented based on IVR menu selections and/or other events.

Figure 5:
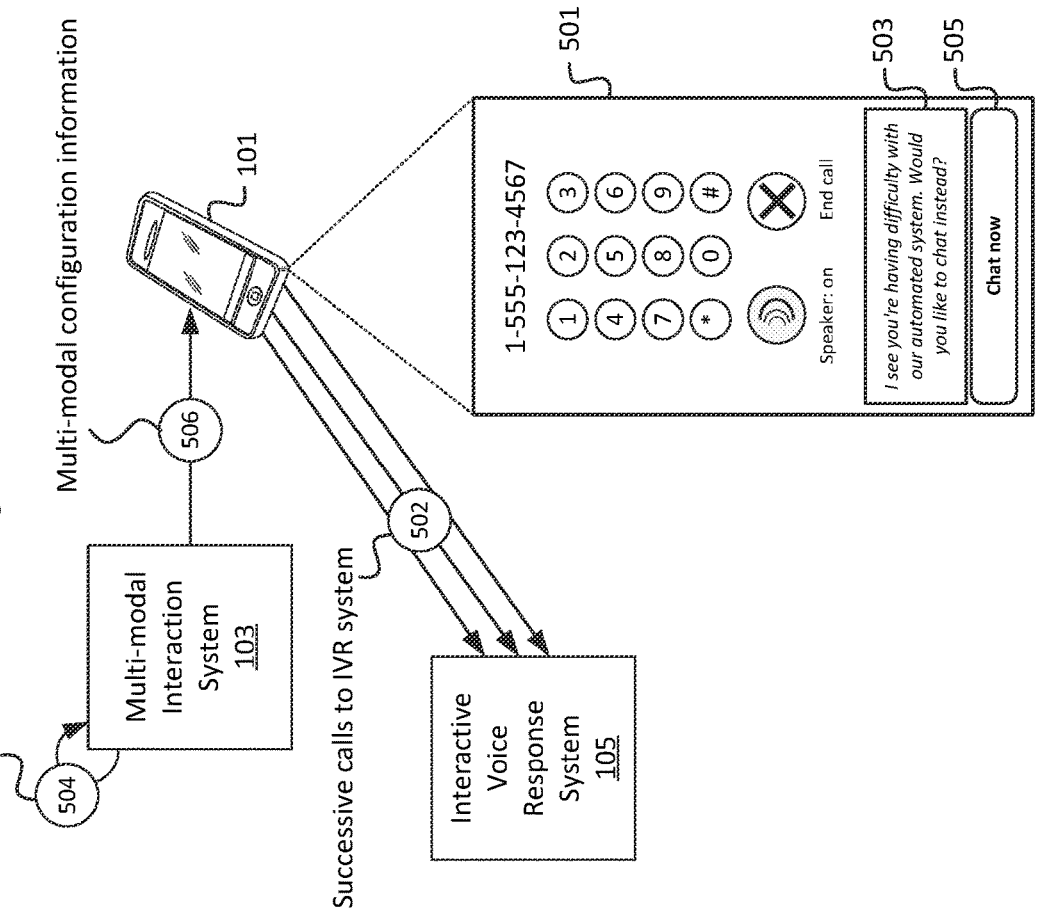

For example, as shown in FIG. 5, UE 101 may place (at 502) multiple successive calls to IVR system 105. This may reflect a situation where a user of UE 101 is experiencing difficulty with IVR system 105, such as frustration or confusion with IVR menu options, dissatisfaction with wait times, and/or other potential difficulties or issues. MMI system 103 may receive one or more indications (e.g., from UE 101 and/or IVR system 105) regarding the successive calls, and may determine (at 504) multi-modal configuration information based on the successive calls. For example, MMI system 103 may determine that UE 101 has contacted IVR system 105 at least a threshold quantity of times within a particular time frame (e.g., three times within one hour, or some other quantity within some other time frame), and the multi-modal configuration information may thus be geared towards providing some form of interaction to UE 101 in addition to, or in lieu of, IVR interactions.

For example, in this example, MMI system 103 may determine (at 504) that a chat option should be presented to UE 101. Such chat option may be an option to communicate with a live operator or automated text-based system via text-based messaging, which may be provided via the above-mentioned API or application and/or some other suitable application. The multi-modal configuration information (at 506) may include an instruction to present text, such as "I see you're having difficulty with our automated system. Would you like to chat instead?" via information display area 503, included in UI 501 presented by UE 101. For example, the instruction may include the text itself, and/or may include a reference to utilize such text as previously maintained or stored by UE 101 (e.g., by the API or application mentioned above). Further, the configuration information may include an instruction to present selectable option 505, which may be an option to initiate a chat session (e.g., text-based messaging) with a live operator or automated system.

Figure 6:
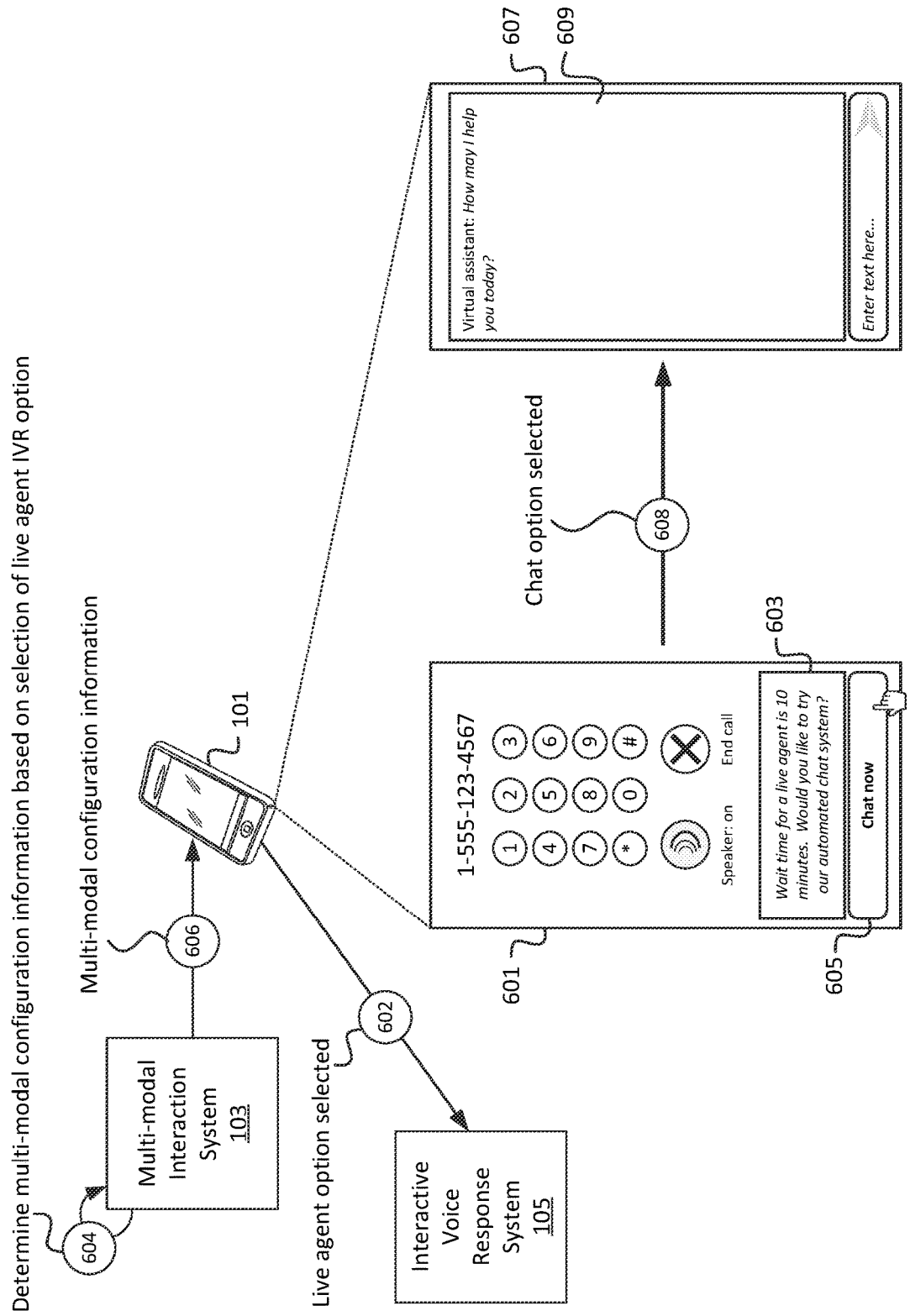

In another example, as shown in FIG. 6, UE 101 may engage in a voice call with IVR system 105, and may select (at 602) an option to speak with a live agent. MMI system 103 may be notified of this selection by UE 101 and/or by IVR system 105, as discussed above. Accordingly, MMI system 103 may determine (at 604) configuration information for multi-modal UI 601 for UE 101 to present based on the selection of the IVR option to speak with a live agent. For example, MMI system 103 may receive, from IVR system 105, an indication of a wait time associated with speaking with a live agent, which is 10 minutes in the example shown in FIG. 6. MMI system 103 may thus provide (at 606) multi-modal configuration information to UE 101, which may accordingly present text via information display area 603 ("Wait time for a live agent is 10 minutes. Would you like to try our automated system?"). Such text may be include in, or referenced by, the received configuration information. Further, UE 101 may present, in multi-modal UI 601, selectable option 605, which may be an option to initiate text-based messaging with a live agent or an automated text-based system.

In this example, UE 101 may receive (at 608) a selection of option 605. While shown in the figure as one arrow, arrow 608 may include one or more operations, signals, messages, or the like. For example, as similarly described above (e.g., at 218), UE 101 may notify MMI system 103 of the selection, and MMI system 103 may provide (e.g., as discussed above at 226) updated multi-modal configuration information to UE 101. Based on the updated multi-modal configuration information, UE 101 may present multi-modal UI 607.

As shown, multi-modal UI 607 may include display area 609, which may include messages associated with an automated text-based messaging system which may be implemented by, and/or may be communicatively coupled with, MMI system 103. In this example, the multi-modal configuration information may include an introductory message associated with the automated messaging system, such as "How may I help you today?" Multi-modal UI may also include one or more options to input text to the system, automated messaging system. Such input may be provided to MMI system 103, based on which MMI system 103 may provide updated multi-modal configuration information (e.g., responses generated based on input provided via UE 101).

In some embodiments, multi-modal UI 607 may be presented in lieu of a number pad (e.g., as presented in multi-modal UI 601). In some embodiments, multi-modal UI 607 may be presented in addition to the number pad, or as a series of notifications. In some embodiments, a selectable option may be presented via multi-modal UI 607 to enable or disable the display of the number pad and/or to otherwise present the number pad (e.g., using a "picture-in-picture" function or other suitable function) in conjunction with one or more of the above-mentioned elements of multi-modal UI 607.

Figure 7:
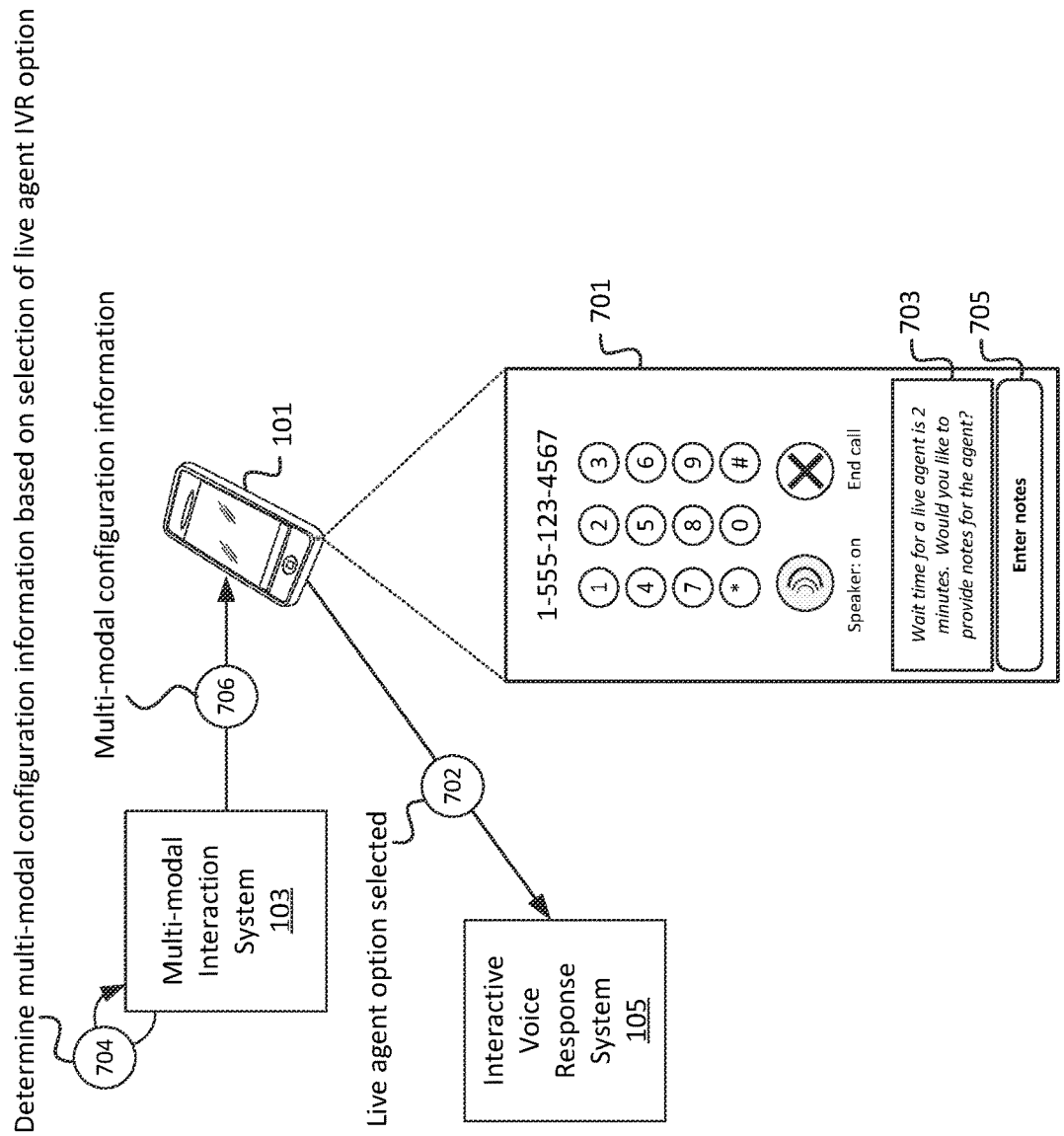

FIG. 7 illustrates another example of a multi-modal UI 701 of some embodiments. In this example scenario, UE 101 may select (at 702) an option (e.g., an option associated with an IVR menu offered by IVR system 105) to speak with a live agent. MMI system 103 may be notified of this selection by UE 101 and/or by IVR system 105, as discussed above. Accordingly, MMI system 103 may determine (at 704) configuration information for multi-modal UI 701 for UE 101 to present based on the selection of the IVR option to speak with a live agent. For example, MMI system 103 may receive, from IVR system 105, an indication of a wait time associated with speaking with a live agent, which is 2 minutes in the example shown in FIG. 7. MMI system 103 may thus provide (at 706) multi-modal configuration information to UE 101, which may accordingly present text via information display area 703 ("Wait time for a live agent is 2 minutes. Would you like to provide notes for the agent?"). Such text may be include in, or referenced by, the received configuration information. Further, UE 101 may present, in multi-modal UI 701, selectable option 705, which may be an option to input text that will be presented to the live agent once the live agent joins the call.

In some embodiments, as reflected in the examples shown in FIGS. 6 and 7, different call states or other information may be used by MMI system 103 to determine different information to present via a multi-modal UI. For example, in the example of FIG. 6, MMI system 103 may determine that information 603 and option 605 should be presented based on the relatively long (e.g., 10 minutes) estimated wait time for the live agent, as indicated by IVR system 105. On the other hand, in the example of FIG. 7, MMI system 103 may determine that information 703 and option 705 should be presented based on the relatively short (e.g., 2 minutes) estimated wait time for the live agent. Further, while options 605 and 705 are shown in different examples, in some embodiments, both options 605 and 705 may be presented in the same multi-modal UI (e.g., a user may be simultaneously provided with an option to initiate a text-based chat session and an option to provide notes to a live agent once a live agent becomes available).

Figure 8:
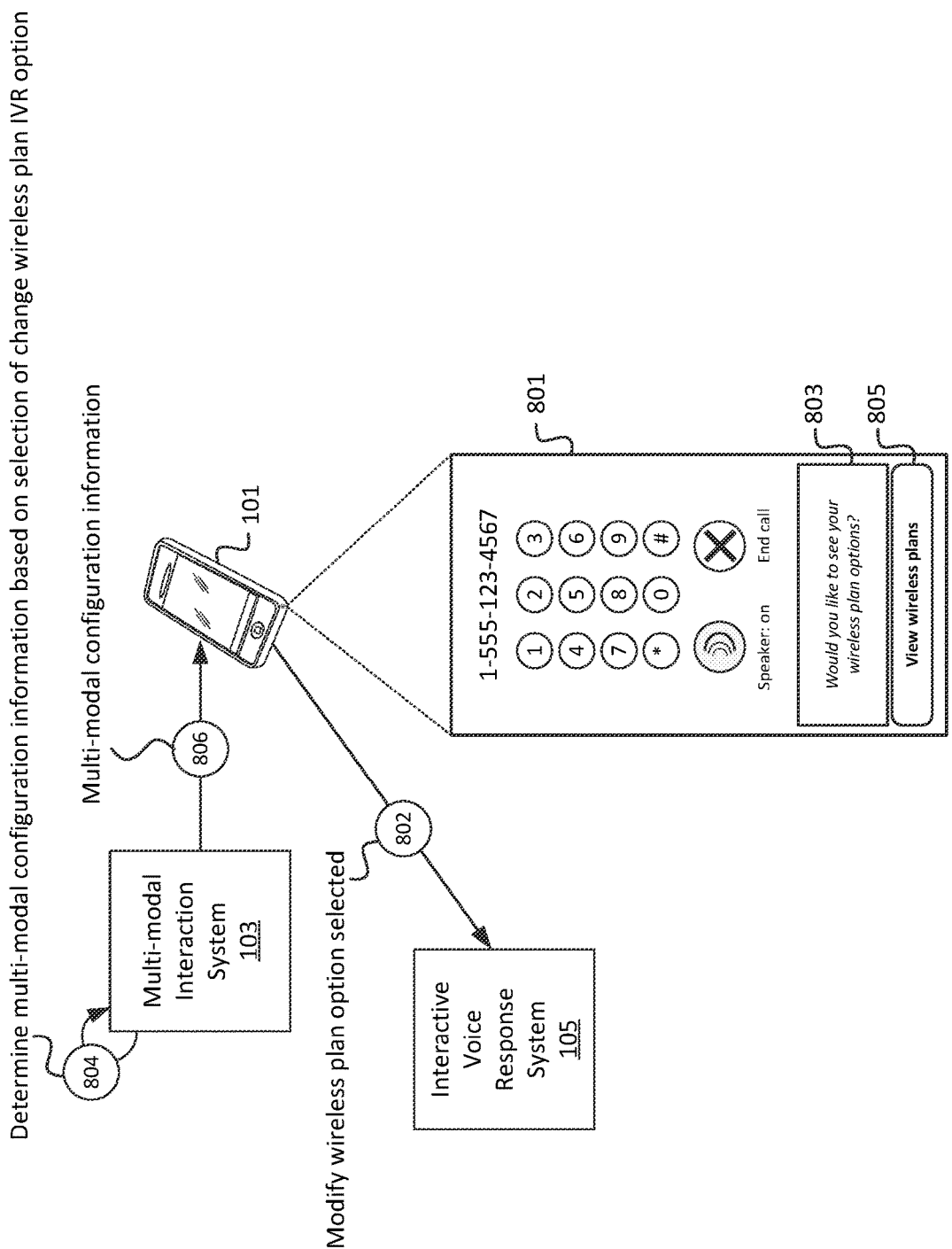

FIG. 8 illustrates another example multi-modal UE 801, which may be presented by UE 101 in accordance with some embodiments. For example, as shown, UE 101 may select (at 802) a particular IVR menu option to modify a wireless plan associated with UE 101 (e.g., a subscription or plan whereby a wireless telecommunications network provides wireless connectivity to UE 101).

MMI system 103 may be notified of this selection by UE 101 and/or by IVR system 105, as discussed above. Accordingly, MMI system 103 may determine (at 804) configuration information for multi-modal UI 801 for UE 101 to present based on the selection of the IVR option to modify the wireless plan associated with UE 101. For example, MMI system 103 may determine that a visual menu should be offered at UE 101, where the visual menu presents available wireless plans and/or available modifications to the wireless plan associated with UE 101. MMI system 103 may, for example, have received such information from IVR system 105 during a registration process, and/or may have determined or generated such information based on machine learning techniques. In some embodiments, MMI system 103 may receive or obtain information associated with UE 101, such as a current plan and/or available plans, from one or more elements of a wireless telecommunications network, such as a Home Subscriber Server ("HSS"), Unified Data Management function ("UDM"), or other suitable device or system that maintains subscription or plan information associated with UE 101. In this manner, the options presented to UE 101 may be tailored to UE 101, thus further providing a robust user experience.

MMI system 103 may thus provide (at 806) multi-modal configuration information to UE 101 that may accordingly present text information display area 803 ("Would you like to see your wireless plan options?"). Such text may be include in, or referenced by, the received configuration information. Further, UE 101 may present, in multi-modal UI 801, selectable option 805, which may be an option to view and select available wireless plan options.

In this manner, the user experience of a user of UE 101 may be enhanced, in that the user may not need to wait for a live agent to discuss wireless plans, and/or may not need to listen to audible options presented by IVR system 105. While the example of FIG. 8 is provided in the context of an option to view and select wireless plans, similar concepts may apply for other types of selections available to a user, such as products to purchase, technical support requests, and/or other suitable selections.

Figure 9:
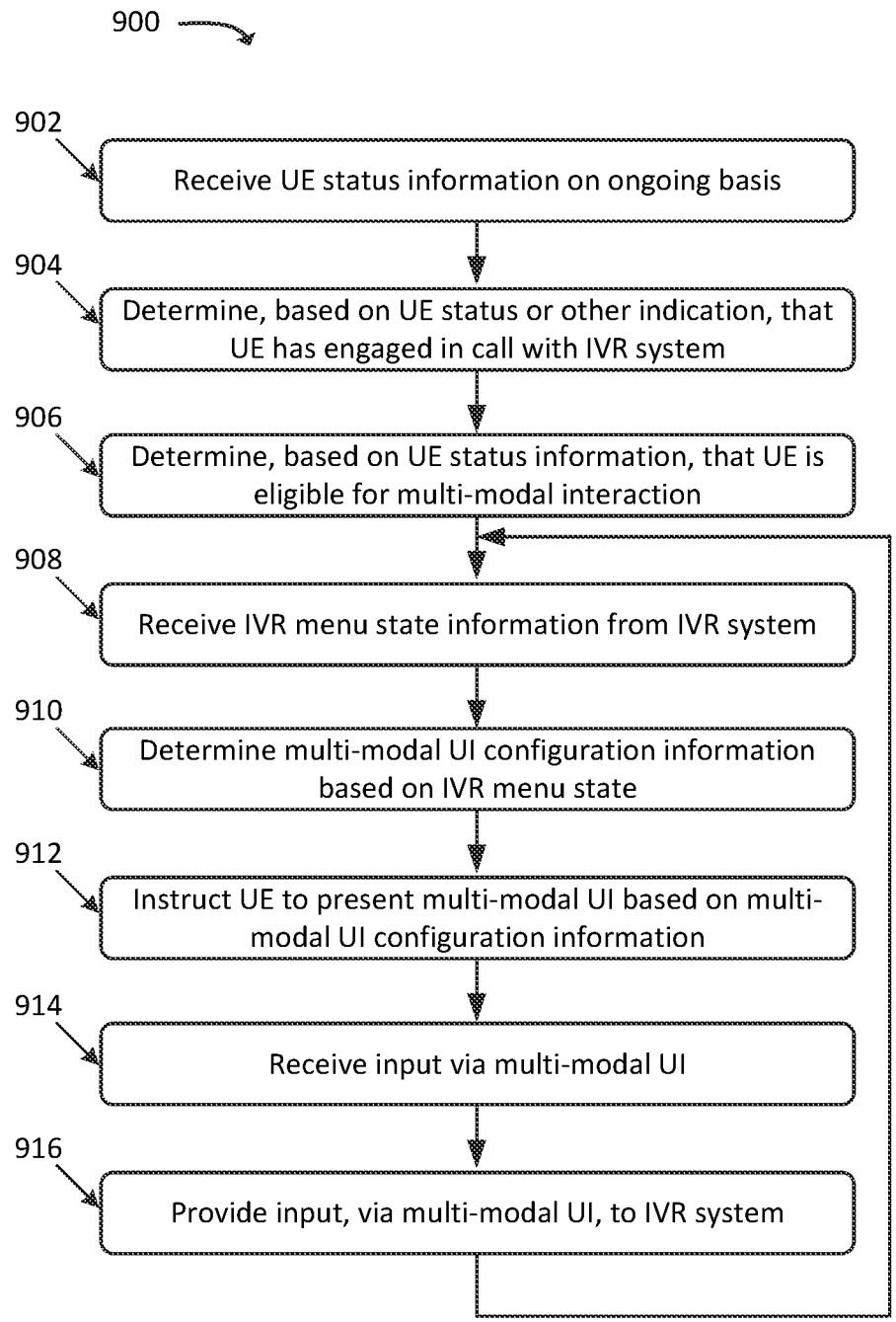
FIG. 9 illustrates an example process for providing a multi-modal experience, in accordance with some embodiments.

FIG. 9 illustrates an example process 900 for providing a multi-modal experience via UE 101. In some embodiments, some or all of process 900 may be performed by MMI system 103. In some embodiments, one or more other devices may perform some or all of process 900 in concert with, and/or in lieu of, MMI system 103.

As shown, process 900 may include receiving (at 902) UE status information associated with UE 101 on an ongoing basis. For example, MMI system 103 may receive such information from UE 101 (e.g., an API or application executing on UE 101 which is configured to communicate with MMI system 103). In some embodiments, MMI system 103 may receive UE status information from one or more other sources, such as an external device or system that receives or collects such UE status information (e.g., with the consent of a user of UE 101), such as a HSS or UDM of a wireless telecommunications network.

Process 900 may further include determining (at 904), based on the UE status information and/or other indication, that UE 101 has engaged in a call with a particular IVR system 105. For example, UE 101 or IVR system 105 may notify MMI system 103 regarding the call, MMI system 103 may detect the call based on monitoring UE status information from UE 101, and/or one or more other devices or systems (e.g., a telephony application server ("TAS")) may notify MMI system 103 of the call.

Process 900 may additionally include determining (at 906), based on the UE status information, that UE 101 is eligible for multi-modal interaction. For example, MMI system 103 may determine that UE 101 is connected to an external audio device, that UE 101 is not associated with a driver of a vehicle, and/or that UE 101 is able to simultaneously present multiple modes of interaction (e.g., audible interaction such as interaction with an IVR menu and visible interaction such as interaction with a multi-modal UI, as described herein).

Process 900 may also include receiving (at 908) IVR menu state information from IVR system 105. For example, IVR system 105 may implement an API and/or may otherwise communicate with MMI system 103, to indicate one or more IVR menu items offered to UE 101 and/or one or more IVR menu selections made by UE 101. Additionally, or alternatively, UE 101 may provide information to MMI system 103, indicating one or more IVR menu items offered to UE 101 and/or one or more IVR menu selections made by UE 101.

Process 900 may further include determining (at 910) multi-modal configuration information based on the IVR menu state. For example, MMI system 103 may maintain information associating particular IVR menu states to particular multi-modal UIs and/or information or option to present via such multi-modal UIs. Such information may have been provided by IVR system 105 (e.g., during a registration process) and/or determined by MMI system 103 via machine learning or other suitable techniques (e.g., based on historical interactions between IVR system 105 and one or more other UEs 101).

Process 900 may additionally include instructing (at 912) UE 101 to present a multi-modal UI based on the determined multi-modal configuration information. For example, MMI system 103 may provide information to display via a multi-modal UI at UE 101, which may indicate a current status of the call and/or may be based on the IVR menu state. Further, MMI system 103 may provide one or more selectable options to present at UE 101, the selection of which may cause UE 101 to present further information or selectable options (e.g., information regarding, and selectable options to select, items for purchase, technical support advice, or the like).

Process 900 may also include receiving (at 914) input via the provided multi-modal UI. For example, UE 101 may indicate, to MMI system 103, one or more options selected via the provided multi-modal UI. In some embodiments, MMI system 103 may update the multi-modal UI configuration information and provide the updated multi-modal UI configuration to UE 101 based on the received input.

Additionally, or alternatively, MMI system 103 may provide (at 916) information regarding the received interactions with the multi-modal UI to IVR system 105, based on which IVR system 105 may update the IVR menu state. Once the IVR menu state has been updated, one or more of operations 908-916 may be iteratively repeated, in order to continue to provide up-to-date multi-modal UI information and options to UE 101.

Figure 10:
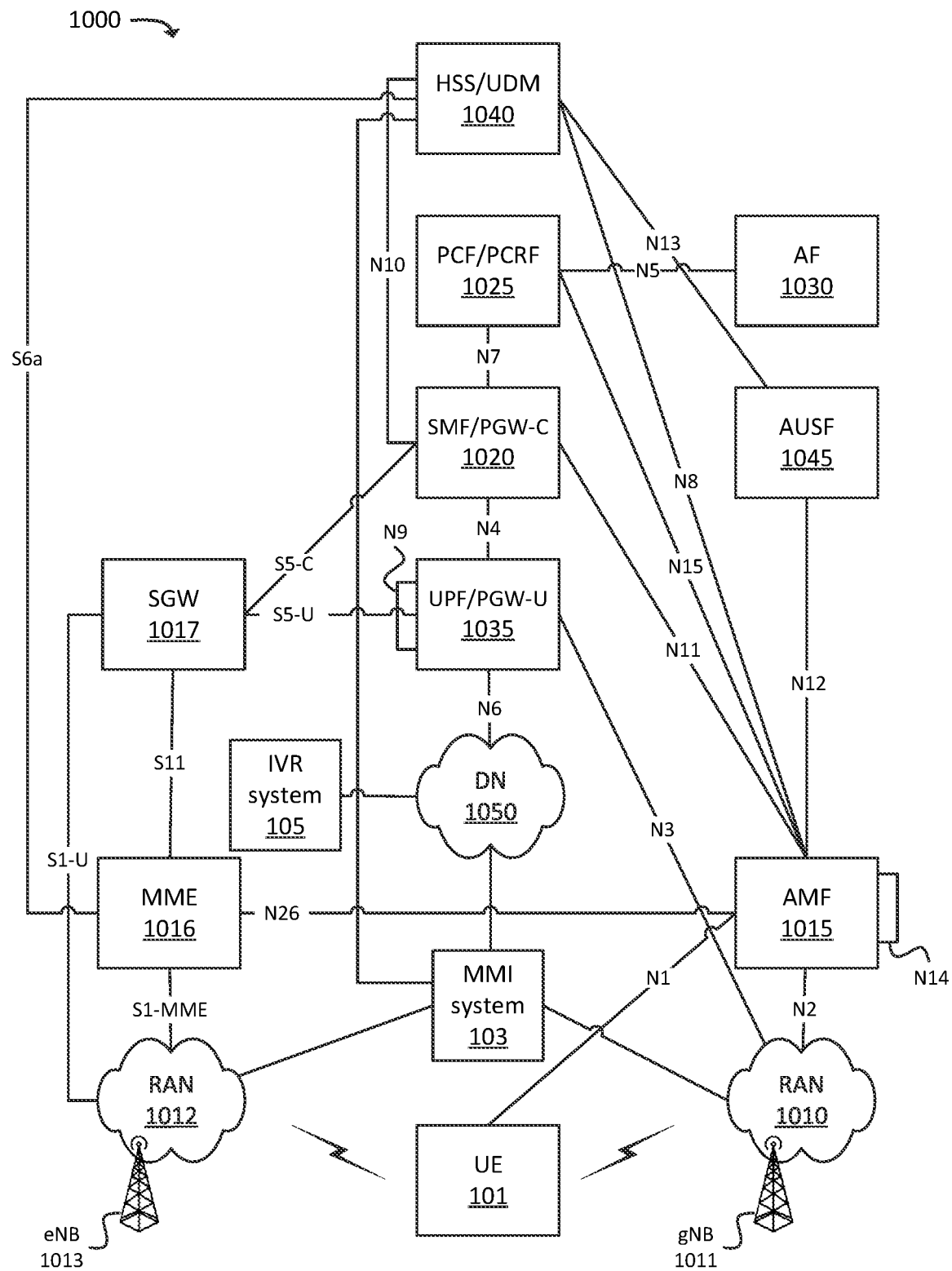
FIG. 10 illustrates an example environment in which one or more embodiments, described herein, may be implemented.

FIG. 10 illustrates an example environment 1000, in which one or more embodiments may be implemented. In some embodiments, environment 1000 may correspond to a Fifth Generation ("5G") network, and/or may include elements of a 5G network. In some embodiments, environment 1000 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 1000 may include UE 1001, RAN 1010 (which may include one or more Next Generation Node Bs ("gNB s") 1011), RAN 1012 (which may include one or more one or more evolved Node Bs ("eNBs") 1013), and various network functions such as Access and Mobility Management Function ("AMF") 1015, Mobility Management Entity ("MME") 1016, Serving Gateway ("SGW") 1017, Session Management Function ("SMF")/Packet Data Network ("PDN") Gateway ("PGW")-Control plane function ("PGW-C") 1020, Policy Control Function ("PCF")/Policy Charging and Rules Function ("PCRF") 1025, Application Function ("AF") 1030, User Plane Function ("UPF")/PGW-User plane function ("PGW-U") 1035, Home Subscriber Server HSS/UDM 1040, Authentication Server Function ("AUSF") 1045, MMI system 103, and IVR system 105. Environment 1000 may also include one or more networks, such as Data Network ("DN") 1050.

The quantity of devices and/or networks, illustrated in FIG. 10, is provided for explanatory purposes only. In practice, environment 1000 may include additional devices and/or networks, fewer devices and/or networks, different devices and/or networks, or differently arranged devices and/or networks than illustrated in FIG. 10. For example, while not shown, environment 1000 may include devices that facilitate or enable communication between various components shown in environment 1000, such as routers, modems, gateways, switches, hubs, etc. Alternatively, or additionally, one or more of the devices of environment 1000 may perform one or more network functions described as being performed by another one or more of the devices of environment 1000. Devices of environment 1000 may interconnect with each other and/or other devices via wired connections, wireless connections, or a combination of wired and wireless connections. In some implementations, one or more devices of environment 1000 may be physically integrated in, and/or may be physically attached to, one or more other devices of environment 1000.

UE 1001 may include a computation and communication device, such as a wireless mobile communication device that is capable of communicating with RAN 1010, RAN 1012, and/or DN 1050. UE 1001 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, a Mobile-to-Mobile ("M2M") device, an Internet of Things ("IoT") device, or another type of mobile computation and communication device. UE 1001 may send traffic to and/or receive traffic (e.g., user plane traffic) from DN 1050 via RAN 1010, RAN 1012, and UPF/PGW-U 1035.

RAN 1010 may be, or may include, a 5G RAN that includes one or more base stations (e.g., one or more gNBs 1011), via which UE 1001 may communicate with one or more other elements of environment 1000. UE 1001 may communicate with RAN 1010 via an air interface (e.g., as provided by gNB 1011). For instance, RAN 1010 may receive traffic (e.g., voice call traffic, data traffic, messaging traffic, signaling traffic, etc.) from UE 1001 via the air interface, and may communicate the traffic to UPF/PGW-U 1035, and/or one or more other devices or networks. Similarly, RAN 1010 may receive traffic intended for UE 1001 (e.g., from UPF/PGW-U 1035, AMF 1015, and/or one or more other devices or networks) and may communicate the traffic to UE 1001 via the air interface.

RAN 1012 may be, or may include, an LTE RAN that includes one or more base stations (e.g., one or more eNBs 1013), via which UE 1001 may communicate with one or more other elements of environment 1000. UE 1001 may communicate with RAN 1012 via an air interface (e.g., as provided by eNB 1013). For instance, RAN 1010 may receive traffic (e.g., voice call traffic, data traffic, messaging traffic, signaling traffic, etc.) from UE 1001 via the air interface, and may communicate the traffic to UPF/PGW-U 1035, and/or one or more other devices or networks. Similarly, RAN 1010 may receive traffic intended for UE 1001 (e.g., from UPF/PGW-U 1035, SGW 1017, and/or one or more other devices or networks) and may communicate the traffic to UE 1001 via the air interface.

AMF 1015 may include one or more devices, systems, Virtualized Network Functions ("VNFs"), etc., that perform operations to register UE 1001 with the 5G network, to establish bearer channels associated with a session with UE 1001, to hand off UE 1001 from the 5G network to another network, to hand off UE 1001 from the other network to the 5G network, manage mobility of UE 1001 between RANs 1010 and/or gNBs 1011, and/or to perform other operations. In some embodiments, the 5G network may include multiple AMFs 1015, which communicate with each other via the N14 interface (denoted in FIG. 10 by the line marked "N14" originating and terminating at AMF 1015).

MME 1016 may include one or more devices, systems, VNFs, etc., that perform operations to register UE 1001 with the EPC, to establish bearer channels associated with a session with UE 1001, to hand off UE 1001 from the EPC to another network, to hand off UE 1001 from another network to the EPC, manage mobility of UE 1001 between RANs 1012 and/or eNBs 1013, and/or to perform other operations.

SGW 1017 may include one or more devices, systems, VNFs, etc., that aggregate traffic received from one or more eNBs 1013 and send the aggregated traffic to an external network or device via UPF/PGW-U 1035. Additionally, SGW 1017 may aggregate traffic received from one or more UPF/PGW-Us 1035 and may send the aggregated traffic to one or more eNBs 1013. SGW 1017 may operate as an anchor for the user plane during inter-eNB handovers and as an anchor for mobility between different telecommunication networks or RANs (e.g., RANs 1010 and 1012).

SMF/PGW-C 1020 may include one or more devices, systems, VNFs, etc., that gather, process, store, and/or provide information in a manner described herein. SMF/PGW-C 1020 may, for example, facilitate in the establishment of communication sessions on behalf of UE 1001. In some embodiments, the establishment of communications sessions may be performed in accordance with one or more policies provided by PCF/PCRF 1025.

PCF/PCRF 1025 may include one or more devices, systems, VNFs, etc., that aggregate information to and from the 5G network and/or other sources. PCF/PCRF 1025 may receive information regarding policies and/or subscriptions from one or more sources, such as subscriber databases and/or from one or more users (such as, for example, an administrator associated with PCF/PCRF 1025).

AF 1030 may include one or more devices, systems, VNFs, etc., that receive, store, and/or provide information that may be used in determining parameters (e.g., quality of service parameters, charging parameters, or the like) for certain applications.

UPF/PGW-U 1035 may include one or more devices, systems, VNFs, etc., that receive, store, and/or provide data (e.g., user plane data). For example, UPF/PGW-U 1035 may receive user plane data (e.g., voice call traffic, data traffic, etc.), destined for UE 1001, from DN 1050, and may forward the user plane data toward UE 1001 (e.g., via RAN 1010, SMF/PGW-C 1020, and/or one or more other devices). In some embodiments, multiple UPFs 1035 may be deployed (e.g., in different geographical locations), and the delivery of content to UE 1001 may be coordinated via the N9 interface (e.g., as denoted in FIG. 10 by the line marked "N9" originating and terminating at UPF/PGW-U 1035). Similarly, UPF/PGW-U 1035 may receive traffic from UE 1001 (e.g., via RAN 1010, SMF/PGW-C 1020, and/or one or more other devices), and may forward the traffic toward DN 1050. In some embodiments, UPF/PGW-U 1035 may communicate (e.g., via the N4 interface) with SMF/PGW-C 1020, regarding user plane data processed by UPF/PGW-U 1035.

HSS/UDM 1040 and AUSF 1045 may include one or more devices, systems, VNFs, etc., that manage, update, and/or store, in one or more memory devices associated with AUSF 1045 and/or HSS/UDM 1040, profile information associated with a subscriber. AUSF 1045 and/or HSS/UDM 1040 may perform authentication, authorization, and/or accounting operations associated with the subscriber and/or a communication session with UE 1001.

MMI system 103 may include one or more devices, systems, VNFs, etc., that perform one or more operations described herein. For example, MMI system 103 may determine that UE 101 is in communication with IVR system 105, may communicate with UE 101 and/or IVR system 105 (e.g., via DN 1050 and/or some other suitable network) to determine a menu state associated with the communication between UE 101 and IVR system 105, and may provide configuration information to UE 101 such that UE 101 may provide a multi-modal interface in conjunction with the call with IVR system 105.

IVR system 105 may include one or more devices or systems that provide IVR menu services to UE 101. For example, IVR system 105 may be reachable to UE 101 via DN 1050 and/or some other suitable network. In some embodiments, IVR system 105 may implement an API and/or may otherwise communicate with MMI system 103 (e.g., via DN 1050).

DN 1050 may include one or more wired and/or wireless networks. For example, DN 1050 may include an Internet Protocol ("IP")-based PDN, a wide area network ("WAN") such as the Internet, a private enterprise network, and/or one or more other networks. UE 1001 may communicate, through DN 1050, with data servers, other UEs 1001, and/or to other servers or applications that are coupled to DN 1050. DN 1050 may be connected to one or more other networks, such as a public switched telephone network ("PSTN"), a public land mobile network ("PLMN"), and/or another network. DN 1050 may be connected to one or more devices, such as content providers, applications, web servers, and/or other devices, with which UE 1001 may communicate.

Figure 11:
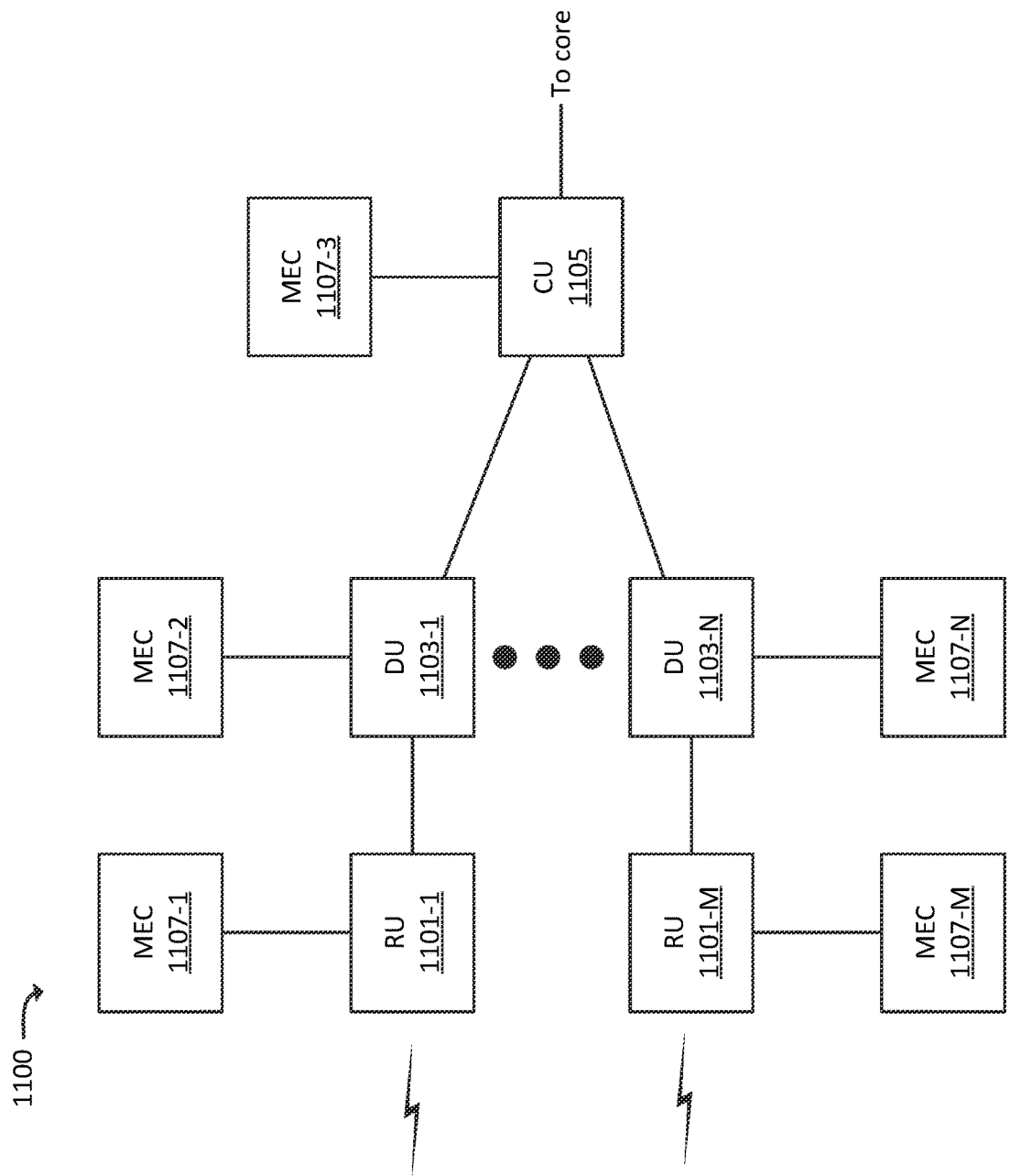
FIG. 11 illustrates an example arrangement of a radio access network ("RAN"), in accordance with some embodiments.

FIG. 11 illustrates an example Distributed Unit ("DU") network 1100, which may be included in and/or implemented by one or more RANs (e.g., RAN 1010). In some embodiments, a particular RAN may include one DU network 1100. In some embodiments, a particular RAN may include multiple DU networks 1100. In some embodiments, DU network 1100 may correspond to a particular gNB 1011 of a 5G RAN (e.g., RAN 1010). In some embodiments, DU network 1100 may correspond to multiple gNBs 1011. In some embodiments, DU network 1100 may correspond to one or more other types of base stations of one or more other types of RANs. As shown, DU network 1100 may include Central Unit ("CU") 1105, one or more Distributed Units ("DUs") 1103-1 through 1103-N (referred to individually as "DU 1103," or collectively as "DUs 1103"), and one or more Remote Units ("RUs") 1101-1 through 1101-M (referred to individually as "RU 1101," or collectively as "RUs 1101").

CU 1105 may communicate with a core of a wireless network (e.g., may communicate with one or more of the devices or systems described above with respect to FIG. 10, such as AMF 1015 and/or UPF/PGW-U 1035). In the uplink direction (e.g., for traffic from UEs 1001 to a core network), CU 1105 may aggregate traffic from DUs 1103, and forward the aggregated traffic to the core network. In some embodiments, CU 1105 may receive traffic according to a given protocol (e.g., Radio Link Control ("RLC")) from DUs 1103, and may perform higher-layer processing (e.g., may aggregate/process RLC packets and generate Packet Data Convergence Protocol ("PDCP") packets based on the RLC packets) on the traffic received from DUs 1103.

In accordance with some embodiments, CU 1105 may receive downlink traffic (e.g., traffic from the core network) for a particular UE 1001, and may determine which DU(s) 1103 should receive the downlink traffic. DU 1103 may include one or more devices that transmit traffic between a core network (e.g., via CU 1105) and UE 1001 (e.g., via a respective RU 1101). DU 1103 may, for example, receive traffic from RU 1101 at a first layer (e.g., physical ("PHY") layer traffic, or lower PHY layer traffic), and may process/aggregate the traffic to a second layer (e.g., upper PHY and/or RLC). DU 1103 may receive traffic from CU 1105 at the second layer, may process the traffic to the first layer, and provide the processed traffic to a respective RU 1101 for transmission to UE 1001.

RU 1101 may include hardware circuitry (e.g., one or more RF transceivers, antennas, radios, and/or other suitable hardware) to communicate wirelessly (e.g., via an RF interface) with one or more UEs 1001, one or more other DUs 1103 (e.g., via RUs 1101 associated with DUs 1103), and/or any other suitable type of device. In the uplink direction, RU 1101 may receive traffic from UE 1001 and/or another DU 1103 via the RF interface and may provide the traffic to DU 1103. In the downlink direction, RU 1101 may receive traffic from DU 1103, and may provide the traffic to UE 1001 and/or another DU 1103.

RUs 1101 may, in some embodiments, be communicatively coupled to one or more Multi-Access/Mobile Edge Computing ("MEC") devices, referred to sometimes herein simply as ("MECs") 1107. For example, RU 1101-1 may be communicatively coupled to MEC 1107-1, RU 1101-M may be communicatively coupled to MEC 1107-M, DU 1103-1 may be communicatively coupled to MEC 1107-2, DU 1103-N may be communicatively coupled to MEC 1107-N, CU 1105 may be communicatively coupled to MEC 1107-3, and so on. MECs 1107 may include hardware resources (e.g., configurable or provisionable hardware resources) that may be configured to provide services and/or otherwise process traffic to and/or from UE 1001, via a respective RU 1101.

For example, RU 1101-1 may route some traffic, from UE 1001, to MEC 1107-1 instead of to a core network (e.g., via DU 1103 and CU 1105). MEC 1107-1 may process the traffic, perform one or more computations based on the received traffic, and may provide traffic to UE 1001 via RU 1101-1. In this manner, ultra-low latency services may be provided to UE 1001, as traffic does not need to traverse DU 1103, CU 1105, and an intervening backhaul network between DU network 1100 and the core network. In some embodiments, MEC 1107 may include, and/or may implement some or all of the functionality described above with respect to MMI system 103 and/or IVR system 105.

Figure 12:
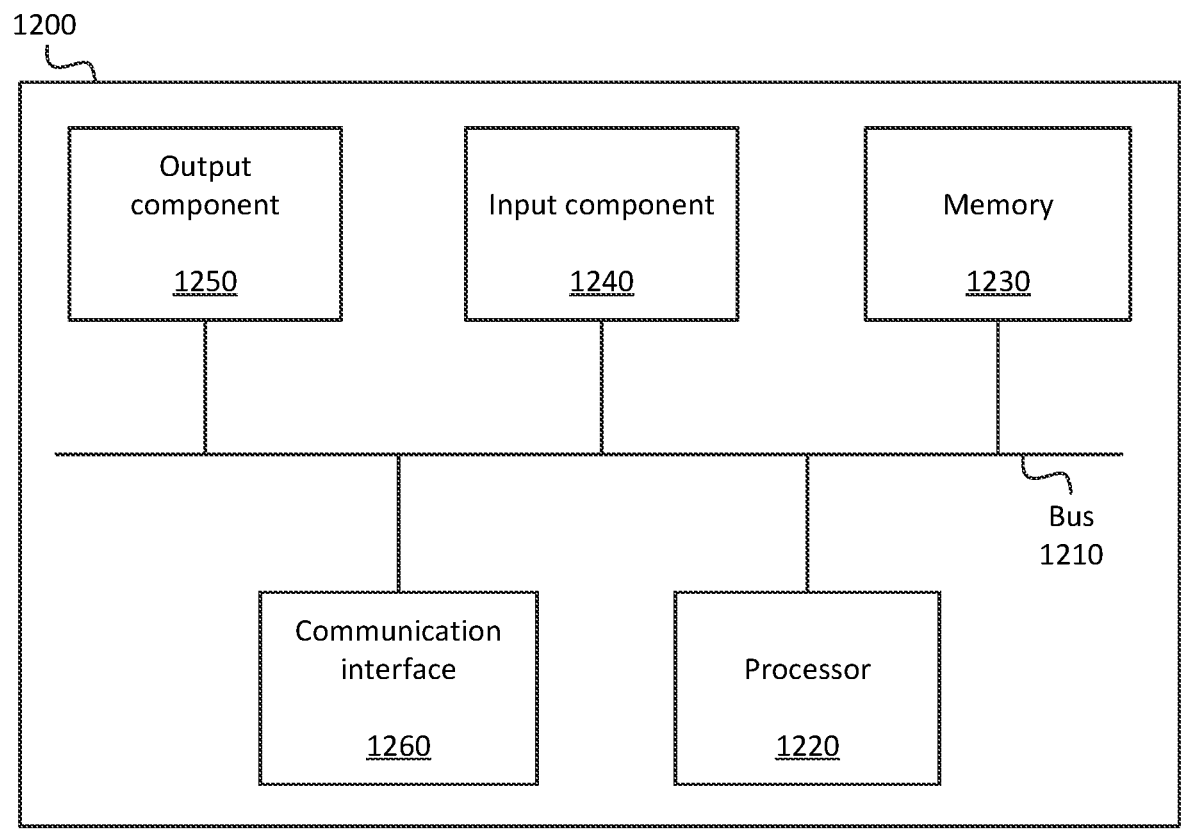
FIG. 12 illustrates example functional components of one or more devices, in accordance with one or more embodiments described herein.

FIG. 12 illustrates example components of device 1200. One or more of the devices described above may include one or more devices 1200. Device 1200 may include bus 1210, processor 1220, memory 1230, input component 1240, output component 1250, and communication interface 1260. In another implementation, device 1200 may include additional, fewer, different, or differently arranged components.

Bus 1210 may include one or more communication paths that permit communication among the components of device 1200. Processor 1220 may include a processor, microprocessor, or processing logic that may interpret and execute instructions. Memory 1230 may include any type of dynamic storage device that may store information and instructions for execution by processor 1220, and/or any type of non-volatile storage device that may store information for use by processor 1220.

Input component 1240 may include a mechanism that permits an operator to input information to device 1200, such as a keyboard, a keypad, a button, a switch, etc. Output component 1250 may include a mechanism that outputs information to the operator, such as a display, a speaker, one or more light emitting diodes ("LEDs"), etc.

Communication interface 1260 may include any transceiver-like mechanism that enables device 1200 to communicate with other devices and/or systems. For example, communication interface 1260 may include an Ethernet interface, an optical interface, a coaxial interface, or the like. Communication interface 1260 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1200 may include more than one communication interface 1260. For instance, device 1200 may include an optical interface and an Ethernet interface.

Device 1200 may perform certain operations relating to one or more processes described above. Device 1200 may perform these operations in response to processor 1220 executing software instructions stored in a computer-readable medium, such as memory 1230. A computer-readable medium may be defined as a non-transitory memory device. A memory device may include space within a single physical memory device or spread across multiple physical memory devices. The software instructions may be read into memory 1230 from another computer-readable medium or from another device. The software instructions stored in memory 1230 may cause processor 1220 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-9), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
output, to a user equipment (UE) that is engaged in a call, a first instruction to present a set of visual information during the call;
determine that confirmation of presentation of the set of visual information has not been received from the UE; and
output, to the UE and based on the determination that the confirmation has not been received from the UE, a second instruction to obtain a particular application, wherein the UE obtains the particular application based on the second instruction and presents the set of visual information via the particular application during the call.

2. The device of claim 1, wherein the call is between the UE and another device, wherein the one or more processors are further configured to:
receive user input provided via the application from the UE; and
provide an indication of the user input to the other device.

3. The device of claim 2, wherein the other device includes an interactive voice-based system.

4. The device of claim 2, wherein the user input includes a selection of a particular menu item presented by the particular application, wherein the menu item corresponds to audible information provided by the other device during the call.

5. The device of claim 4, wherein the other device modifies audible presentation of information, via the call, based on the selection of the particular menu item.

6. The device of claim 1, wherein the call is between the UE and another device, wherein the one or more processors are further configured to:
receive, from the other device and during the call, an indication of one or more interactions between the other device and the UE; and
provide updated information to the UE based on the one or more interactions between the other device and the UE, wherein providing the updated information to the UE causes the UE to present updated visual information that is based on the provided updated information.

7. The device of claim 1, wherein the set of visual information includes one or more selectable options, wherein when presenting the visual information, the UE presents the one or more selectable options during the call.

8. A non-transitory computer-readable medium storing a plurality of processor-executable instructions to:
output, to a user equipment (UE) that is engaged in a call, a first instruction to present a set of visual information during the call;
determine that confirmation of presentation of the set of visual information has not been received from the UE; and
output, to the UE and based on the determination that the confirmation has not been received from the UE, a second instruction to obtain a particular application, wherein the UE obtains the particular application based on the second instruction and presents the set of visual information via the particular application during the call.

9. The non-transitory computer-readable medium of claim 8, wherein the call is between the UE and another device, wherein the plurality of processor-executable instructions further include processor-executable instructions to:
receive user input provided via the application from the UE; and
provide an indication of the user input to the other device.

10. The non-transitory computer-readable medium of claim 9, wherein the other device includes an interactive voice-based system.

11. The non-transitory computer-readable medium of claim 9, wherein the user input includes a selection of a particular menu item presented by the particular application, wherein the menu item corresponds to audible information provided by the other device during the call.

12. The non-transitory computer-readable medium of claim 11, wherein the other device modifies audible presentation of information, via the call, based on the selection of the particular menu item.

13. The non-transitory computer-readable medium of claim 8, wherein the call is between the UE and another device, wherein the plurality of processor-executable instructions further include processor-executable instructions to:
receive, from the other device and during the call, an indication of one or more interactions between the other device and the UE; and
provide updated information to the UE based on the one or more interactions between the other device and the UE, wherein providing the updated information to the UE causes the UE to present updated visual information that is based on the provided updated information.

14. The non-transitory computer-readable medium of claim 8, wherein the set of visual information includes one or more selectable options, wherein when presenting the visual information, the UE presents the one or more selectable options during the call.

15. A method, comprising:
outputting, to a user equipment (UE) that is engaged in a call, a first instruction to present a set of visual information during the call;
determining that confirmation of presentation of the set of visual information has not been received from the UE; and
outputting, to the UE and based on the determination that the confirmation has not been received from the UE, a second instruction to obtain a particular application, wherein the UE obtains the particular application based on the second instruction and presents the set of visual information via the particular application during the call.

16. The method of claim 15, wherein the call is between the UE and another device, the method further comprising:
receive user input provided via the application from the UE; and
provide an indication of the user input to the other device.

17. The method of claim 16, wherein the user input includes a selection of a particular menu item presented by the particular application, wherein the menu item corresponds to audible information provided by the other device during the call.

18. The method of claim 17, wherein the other device modifies audible presentation of information, via the call, based on the selection of the particular menu item.

19. The method of claim 15, wherein the call is between the UE and another device, the method further comprising:
receive, from the other device and during the call, an indication of one or more interactions between the other device and the UE; and
provide updated information to the UE based on the one or more interactions between the other device and the UE, wherein providing the updated information to the UE causes the UE to present updated visual information that is based on the provided updated information.

20. The method of claim 15, wherein the set of visual information includes one or more selectable options, wherein when presenting the visual information, the UE presents the one or more selectable options during the call.

* * * * *